United States Patent
Eun et al.

(10) Patent No.: US 8,798,439 B2
(45) Date of Patent: Aug. 5, 2014

(54) METHOD AND APPARATUS FOR CONTINUOUSLY REPRODUCING MOVING PICTURE FILES

(75) Inventors: Sung-ho Eun, Suwon-si (KR); Jeoung-gon Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 12/707,835

(22) Filed: Feb. 18, 2010

(65) Prior Publication Data

US 2010/0232761 A1    Sep. 16, 2010

(30) Foreign Application Priority Data

Mar. 10, 2009    (KR) .................. 10-2009-0020353

(51) Int. Cl.
*H04N 5/92* (2006.01)

(52) U.S. Cl.
USPC ........................................ 386/248; 386/239

(58) Field of Classification Search
None
See application file for complete search history.

(56) References Cited

U.S. PATENT DOCUMENTS

| 7,590,938 | B2 | 9/2009 | Chevallier et al. |
| 7,860,821 | B2 | 12/2010 | Takakura et al. |
| 2002/0140826 | A1* | 10/2002 | Sato et al. .................. 348/222.1 |
| 2004/0264932 | A1* | 12/2004 | Li et al. ............................ 386/95 |
| 2006/0013562 | A1* | 1/2006 | Sugino et al. ................... 386/95 |
| 2007/0109427 | A1* | 5/2007 | Satoh et al. ................. 348/231.2 |
| 2009/0067815 | A1* | 3/2009 | Tsutsui ......................... 386/117 |
| 2009/0080864 | A1* | 3/2009 | Rajakarunanayake ........ 386/124 |
| 2013/0120634 | A1 | 5/2013 | Morimoto et al. |

FOREIGN PATENT DOCUMENTS

| CN | 1551210 A | 12/2004 |
| CN | 1836230 A | 9/2006 |
| CN | 1940924 A | 4/2007 |
| CN | 1991807 A | 7/2007 |
| CN | 1992857 A | 7/2007 |
| EP | 1 477 987 A | 11/2004 |
| WO | WO 2008/132538 A1 | 11/2008 |

OTHER PUBLICATIONS

Office Action issued for CN 201010133701.4 (Oct. 28, 2013).

* cited by examiner

*Primary Examiner* — William C Vaughn, Jr.
*Assistant Examiner* — Eileen Adams
(74) *Attorney, Agent, or Firm* — Drinker Biddle & Reath LLP

(57) ABSTRACT

A method and apparatus successively reproduce moving picture files stored in a digital image processing apparatus. The digital image processing apparatus includes a moving picture detector that detects one or more moving picture files from a storage unit which stores one or more kinds of files, a frame classifier that classifies the one or more detected moving picture files based on index frames of the moving picture files, and a successive reproducing unit that reproduces the classified moving picture files successively.

14 Claims, 7 Drawing Sheets

METHOD AND APPARATUS FOR CONTINUOUSLY REPRODUCING MOVING PICTURE FILES

CROSS-REFERENCE TO RELATED PATENT APPLICATIONS

This application claims the priority benefit of Korean Patent Application No. 10-2009-0020353, filed on Mar. 10, 2009, in the Korean Intellectual Property Office, the disclosure of which is incorporated herein in its entirety by reference.

BACKGROUND

1. Field of the Invention

The present invention relates to a method of successively reproducing moving picture files in a digital image processing apparatus.

2. Description of the Related Art

Recently, the introduction of high definition multimedia interface (HDMI) has led to an increased number of users who record and reproduce moving pictures of high image quality. In this case, when a plurality of moving picture files are stored, the moving picture files can be reproduced only separately. Thus, there is a need to reproduce successively a plurality of stored moving pictures files.

SUMMARY

Embodiments of the present invention include a method of successively reproducing a plurality of moving picture files. Embodiments of the present invention also include a method of classifying moving picture files according to characteristics of the moving picture files and successively reproducing the classified moving picture files.

According to an aspect of the present invention, a digital image processing apparatus includes a moving picture detector that detects one or more moving picture files from among a plurality of files stored in a storage unit which stores at least one kind of file. The apparatus also includes a frame classifier that classifies the one or more detected moving picture files based on index frames of the detected moving picture files. The apparatus also includes a successive reproducing unit that reproduces the classified moving picture files successively.

According to another aspect of the present invention, a digital image processing apparatus includes a digital signal processor having a file input coupled with a storage unit which stores at least one kind of file. The digital signal processor is configured to input a plurality of files from the storage unit, detect moving picture files from among the plurality of files stored in the storage unit, and successively reproduce the detected moving picture files.

According to another aspect of the present invention, a method of successively reproducing moving picture files in a digital image processing apparatus including a digital signal processor includes detecting one or more moving picture files from among a plurality of files stored in a storage unit which stores at least one kind of file. The method also includes classifying the one or more detected moving picture files based on index frames of the moving picture files, and successively reproducing the classified moving picture files.

According to another aspect of the present invention, a method of successively reproducing moving picture files in a digital image processing apparatus which includes a digital signal processor includes detecting moving picture files from a storage unit which stores one or more kinds of files, and successively reproducing the detected moving picture files by the digital image processor.

According to an aspect of the present invention, a digital image processing apparatus includes a moving picture detector having a picture file input and a moving picture file output. The moving picture detector is configured to detect one or more moving picture files from among a plurality of files input from a storage unit which stores at least one kind of file. The apparatus also includes a frame classifier having a moving picture file input coupled with the moving picture file output of the moving picture detector and a classified moving picture file output. The frame classifier is configured to classify the one or more detected moving picture files output from the moving picture detector based on index frames of the detected moving picture files and output one or more classified moving picture files. The apparatus also includes a successive reproducing unit having a classified moving picture file input. The successive reproducing unit is configured to reproduce the classified moving picture files successively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
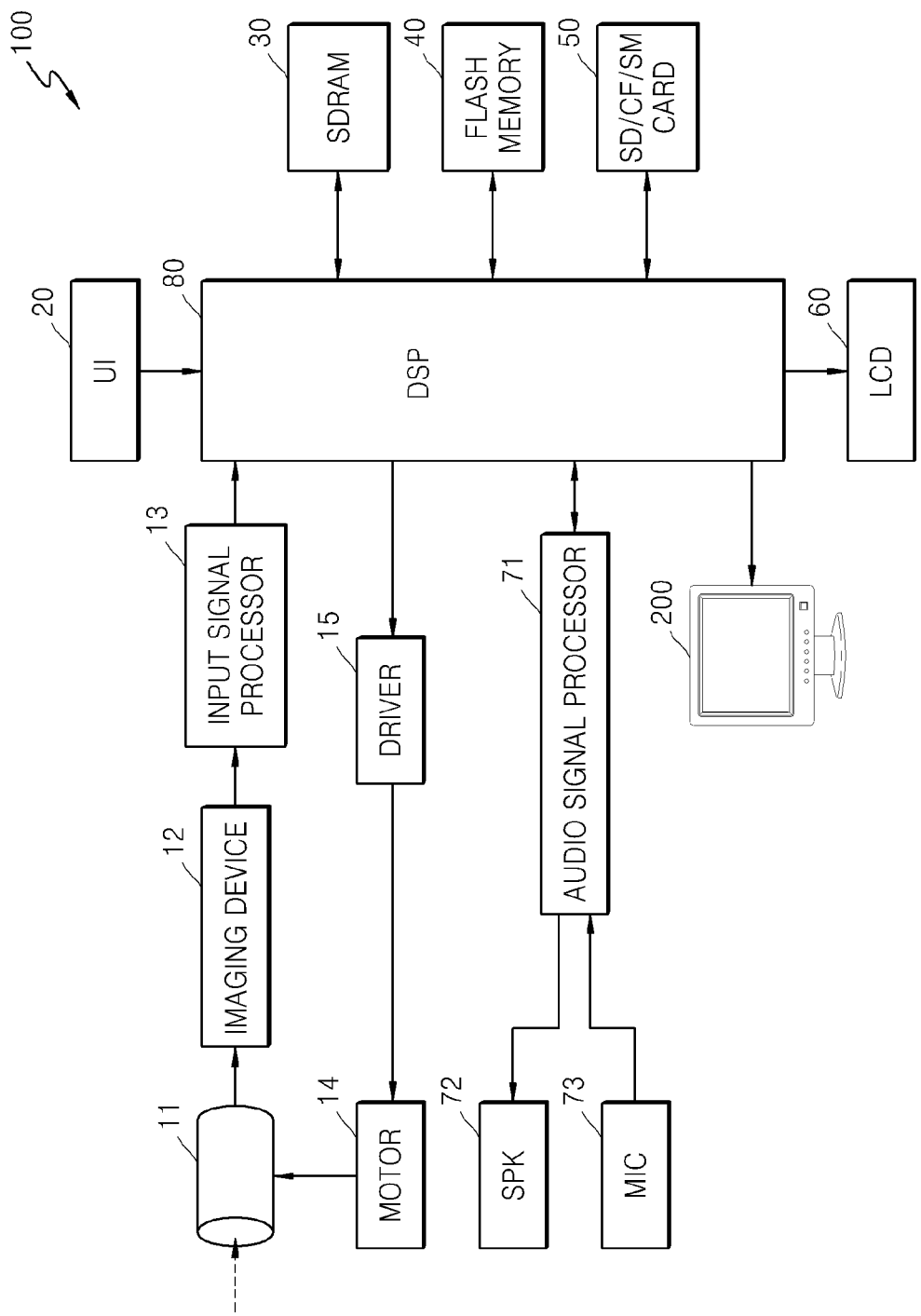
FIG. 1 is a block diagram of a digital image processing apparatus according to an embodiment of the present invention.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

Embodiments of the present invention will be described with reference to accompanying drawings.

FIG. 1 is a block diagram of a digital image processing apparatus 100 according to an embodiment of the present invention. The digital image processing apparatus may be, for example, a camera, a camcorder, a cellular phone, a personal digital assistant (PDA), a portable multimedia player (PMP), a handheld apparatus, etc.

Referring to FIG. 1, the digital image processing apparatus 100 includes an optical unit 11 that receives optical signals from a subject and outputs the received optical signals, an imaging device 12 that converts the optical signals received from the optical unit 11 into electric signals, and an input signal processor 13 that performs signal processing such as reducing noise of the electric signals provided from the imaging device 12 and converts the electric signals into digital signals. The digital image processing apparatus 100 may include a motor 14 that drives the optical unit 11, and a driver 15 that controls operations of the motor 14.

In addition, the digital image processing apparatus 100 may include a user interface (UI) 20 via which a user may input control signals. The digital image processing apparatus 100 may also include a synchronous dynamic random access memory (SDRAM) 30 that temporarily stores input image data, processing data, and processing results. The digital image processing apparatus 100 may also include a flash memory 40 that stores algorithms and setting data for operating the digital image processing apparatus 100, and a secure digital (SD)/compact flash (CF)/smart media (SM) memory card 50 which is a recording device for storing image files.

In addition, a liquid crystal display (LCD) 60 is mounted in the digital image processing apparatus 100. Also, the digital image processing apparatus 100 may include an audio signal processor 71 that converts audio signals to digital signals, converts the obtained digital signals to analog signals, and generates audio files, a speaker 72 that outputs audio signals, and a microphone 73 that inputs audio signals. In addition, the digital image processing apparatus 100 includes a digital signal processor 80 that controls operations of the digital image processing apparatus 100.

The above components of the digital image processing apparatus 100 will be described in more detail as follows.

The optical unit 11 may include a lens unit that collects optical signals, a diaphragm that adjusts an amount of the optical signal that passes therethrough (light intensity), and a shutter that controls an input of the optical signal through the optical unit 11. The lens unit may include a zoom lens that narrows or widens a viewing angle according to a focal length and a focus lens that focuses light of an optical signal from a subject onto the imaging device 12. The lens unit may include one lens or a plurality of lenses. The shutter may be a mechanical shutter, a barrier of which moves in a vertical direction. Otherwise, instead of using the shutter, transmission of electric signals to the imaging device 12 may be controlled to perform a function of the shutter.

The motor 14 that drives the optical unit 11 may control a location of the lens, opening/closing of the diaphragm, and operation of the shutter in order to perform operations such as auto-focusing, automatic exposure adjustment, diaphragm adjustment, zooming, and focus change.

The motor 14 is controlled by the driver 15. The driver 15 controls the operation of the motor 14 according to a control signal input from the digital signal processor 80.

The imaging device 12 receives optical signals input from the optical unit 11 to create an image of a subject. The imaging device 12 may be a complementary metal oxide semiconductor (CMOS) sensor array or a charge coupled device (CCD) sensor array.

The input signal processor 13 may include an analog/digital (A/D) converter which converts the electric signals provided from the imaging device 12, that is, analog signals, into digital signals. In addition, the input signal processor 13 may include a circuit which performs signal processing such as gain adjustment or waveform normalization with respect to the electric signals provided from the imaging device 12.

The user interface (UI) 20 may include an element for performing various settings when the user operates the digital image processing apparatus 100 or photographs. For example, the element may be a button, a key, a touch panel, a touch screen, or a dial. User control signals for turning power on/off, start/stop photographing, start/stop reproducing, searching for images, operation of an optical system, mode conversion, menu control, and selection control may be input by manipulating the element.

The SDRAM 30 temporarily stores RAW image data (RGB data) provided from the input signal processor 13. A predetermined operation with respect to the RAW image data temporarily stored in the SDRAM 30 may be performed according to an operation of the digital signal processor 80, or the RAW image data may be transferred to other components. In addition, the SDRAM 30 may temporarily store executable data corresponding to an algorithm stored in the flash memory 40 after converting data included in the algorithm to executable data. The digital signal processor 80 performs a calculation process using the data temporarily stored in the SDRAM 30 to execute operations according to the algorithm stored in the flash memory 40. In addition, image data which is converted from image files by extracting the image files stored in the flash memory 40 may be temporarily stored in the SDRAM 30. The temporarily stored image data may be transferred to and displayed on the LCD 60.

The flash memory 40 may store an operating system for operating the digital image processing apparatus 100, an application program, and data for executing the algorithm for controlling the digital image processing apparatus 100. The flash memory 40 is just an example, and accordingly, various non-volatile memory devices such as a read only memory (ROM) may be used.

The SD/CF/SM card 50 may record image files generated by compressing image data provided from the input signal processor 13.

The LCD 60 may display images corresponding to the image data provided from the input signal processor 13 in real time, or may display images corresponding to the image data restored from the image files stored in the SD/CF/SM card 50. Although the LCD 60 is described in the present embodiment, an organic electroluminescence device or an electrophoresis display device may be used as the display unit.

The audio signal processor 71 converts audio digital signals provided from the digital signal processor 80 into analog signals, amplifies the analog signals, and transfers the amplified analog signals to the speaker 72 that outputs the amplified analog signals. Otherwise, analog signals are input through the microphone 73, and the input analog signals are converted into digital signals and compressed into audio files. In addition, the compressed audio files may be transferred to the digital signal processor 80 to perform calculation processes with respect to the audio files.

The digital signal processor 80 may reduce noise of the input image data, and may perform image signal processing such as gamma correction, color filter array interpolation, color matrix, color correction, and color enhancement. In addition, the image data generated by processing image signals may be compressed into image files, or the image data may be recovered from the image files. The compression type of the image files may be reversible or nonreversible. As an example, the image data may be compressed in joint photographic experts group (JPEG) files or JPEG2000 files.

In addition, the digital signal processor 80 may perform processes such as processing of non-clear image, coloring, blurring, edge emphasizing, image analyzing, image recognition, or effecting of images. The image recognition may be a scene recognition process. In addition, the digital signal processor 80 may process display images that will be displayed on the LCD 60. For example, the digital signal processor 80 may perform brightness level adjustment, color adjustment, contrast adjustment, contouring adjustment, screen division, character image generation, and image combination.

The digital signal processor 80 may be connected to an external monitor 200 and may perform a predetermined image process to display images on the external monitor 200. In addition, the digital signal processor 80 may transfer image data to the external monitor 200 so that the corresponding images may be displayed on the external monitor 200.

The digital signal processor 80 performs the image processing as described above, and controls each of the components in the digital image processing apparatus according to results of the image processing. In addition, the digital signal processor 80 may control each of the components in the digital image processing apparatus according to a control signal input by the user via the UI 20. The algorithm for performing the image signal processing is stored in the flash memory 40, and the algorithm is converted to executable data in order to perform the calculation process and the executable data is stored in the SDRAM 30. Accordingly, the digital signal processor 80 may perform the corresponding calculation process. In addition, the digital signal processor 80 makes the recognized scene displayed on the LCD 60 during the Scene Recognizing Mode. Configurations for reproducing moving picture files successively by the digital signal processor 80 are shown in FIG. 3.

Figure 2:
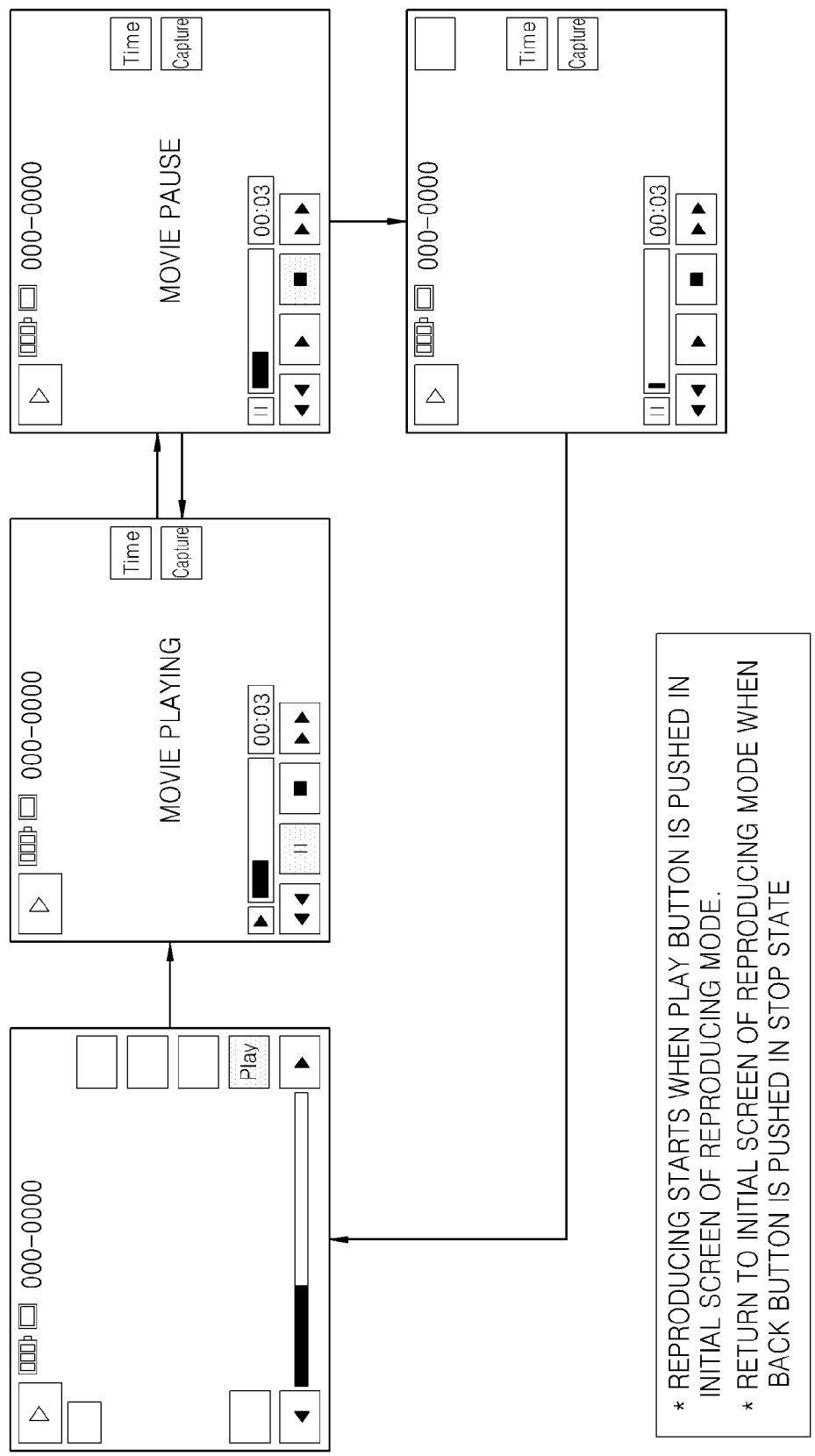
FIG. 2 is a pictorial diagram illustrating processes of reproducing a moving picture according to the conventional art.

FIG. 2 is a pictorial diagram illustrating processes of reproducing moving pictures according to the conventional art.

According to the conventional art, when a moving picture file from among a plurality of moving picture files is reproduced, the moving picture file is reproduced only once from a first frame to a last frame thereof, and then, the reproducing process is automatically terminated. According to the conventional art, the moving picture files cannot be reproduced successively. Accordingly, when all of the moving picture files are to be reproduced, as many operations as the number of moving picture files have to be performed.

Figure 3:
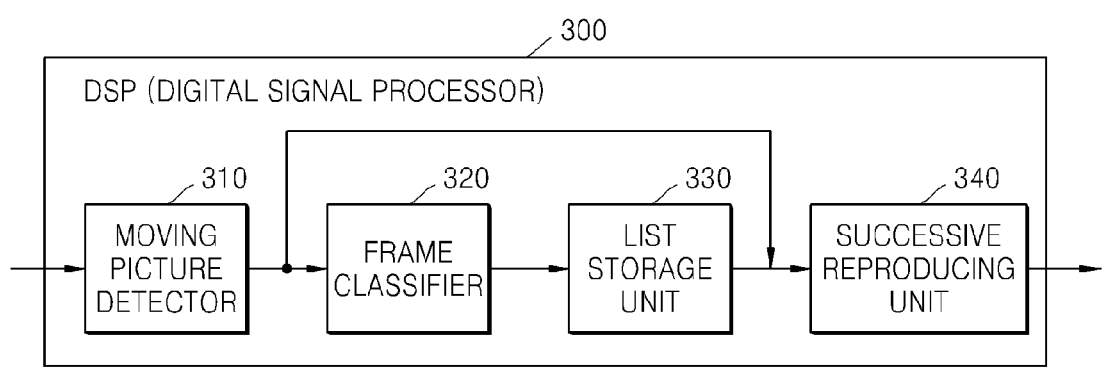
FIG. 3 is a block diagram of an internal structure of a digital signal processor of the digital image processing apparatus of FIG. 1, which classifies moving picture files and successively reproduces the moving pictures files, according to an embodiment of the present invention.

FIG. 3 is a block diagram of an internal structure of a digital signal processor (DSP) 300 of the digital image processing apparatus 100, which classifies moving picture files and successively reproduces the moving picture files, according to an embodiment of the present invention. The DSP 300 may include an embodiment of the DSP 80 of FIG. 1.

Moving picture files may be successively reproduced using two methods as presented in the following exemplary embodiments of the present invention. However, the present invention is not limited to these embodiments.

Figure 4:
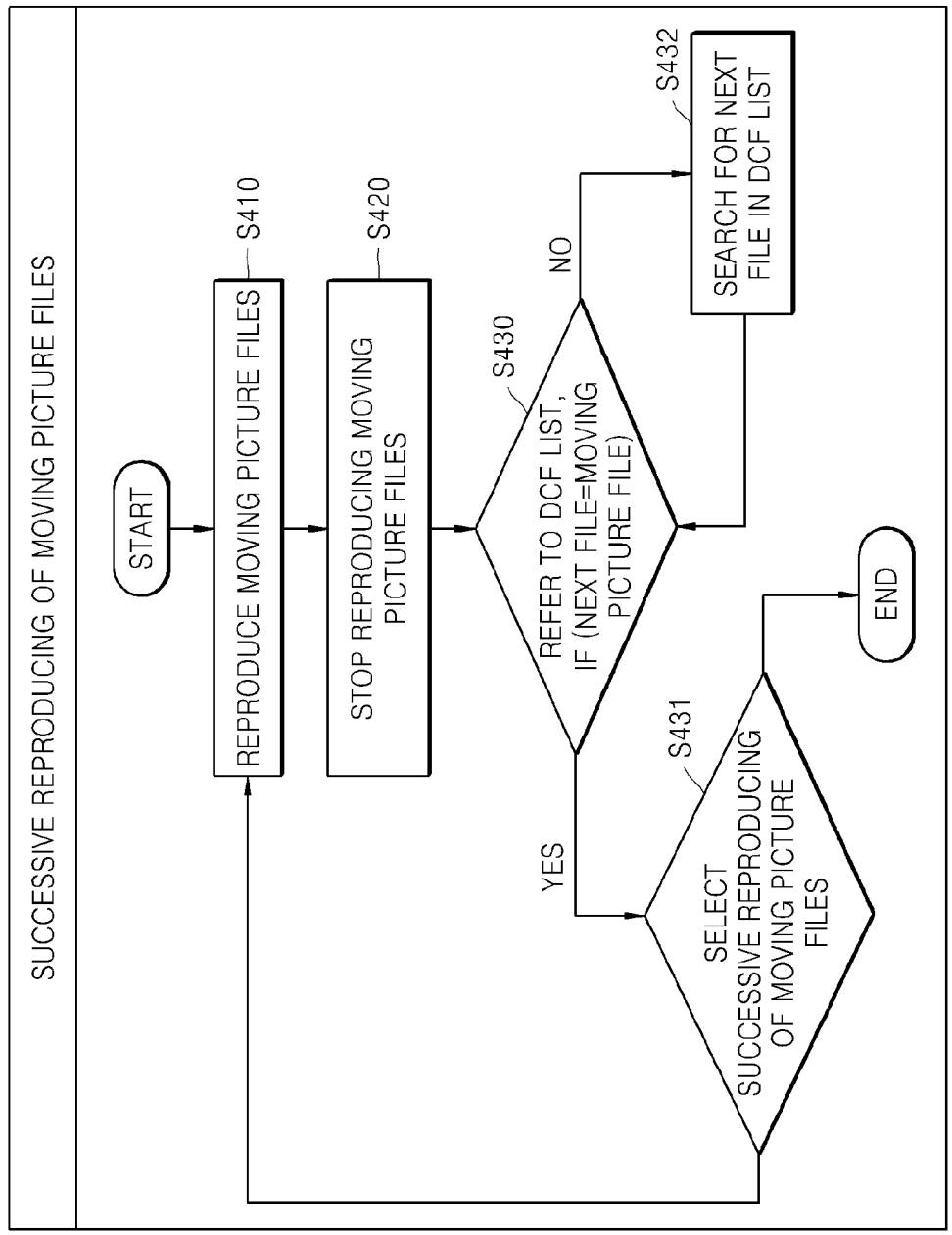
FIG. 4 is a flowchart illustrating a process of automatically reproducing all of the moving picture files stored in the digital image processing apparatus of FIG. 1 successively, according to an embodiment of the present invention.

In an example of reproducing the moving picture files successively, a moving picture detector 310 detects moving picture files from among various files, and the detected moving picture files are reproduced successively. FIG. 4 is a flowchart illustrating a process of automatically reproducing all the moving picture files stored in the digital image processing apparatus 100 successively, according to the present embodiment.

Figure 5:
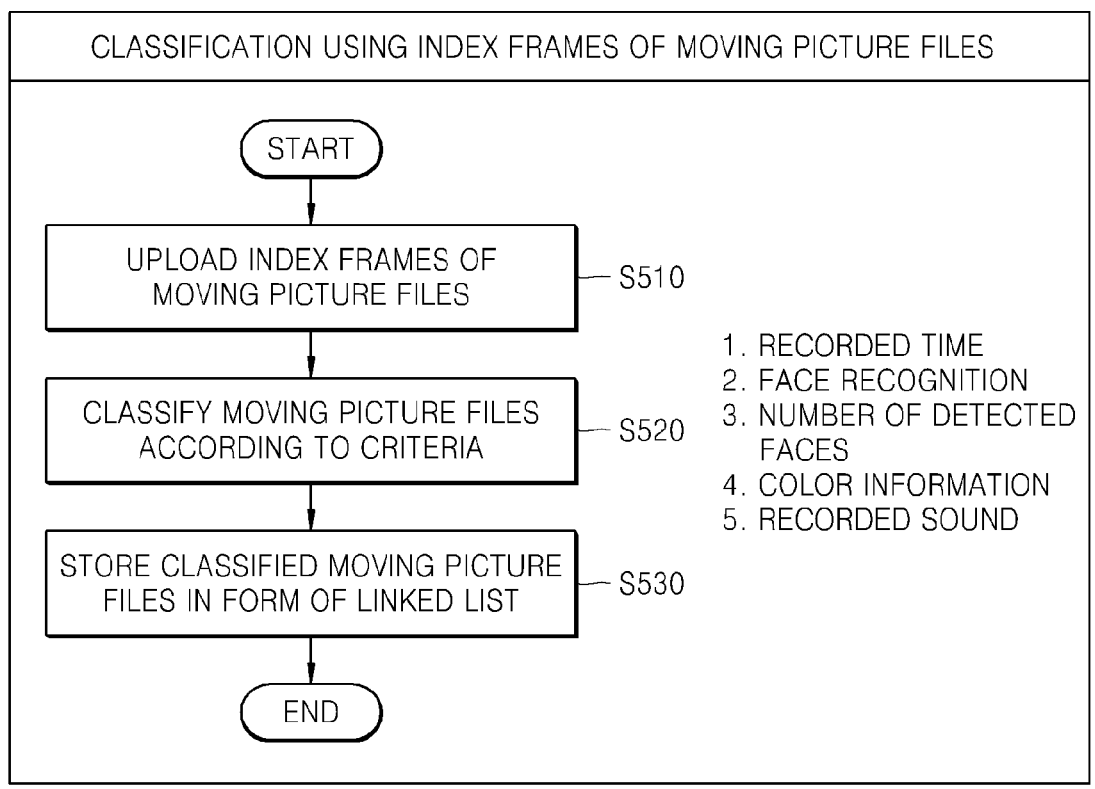
FIG. 5 is a flowchart illustrating a process of successively reproducing the moving picture files that are classified according to a classification criterion from among the moving picture files stored in the digital image processing apparatus of FIG. 1, according to an embodiment of the present invention.
Figure 6:
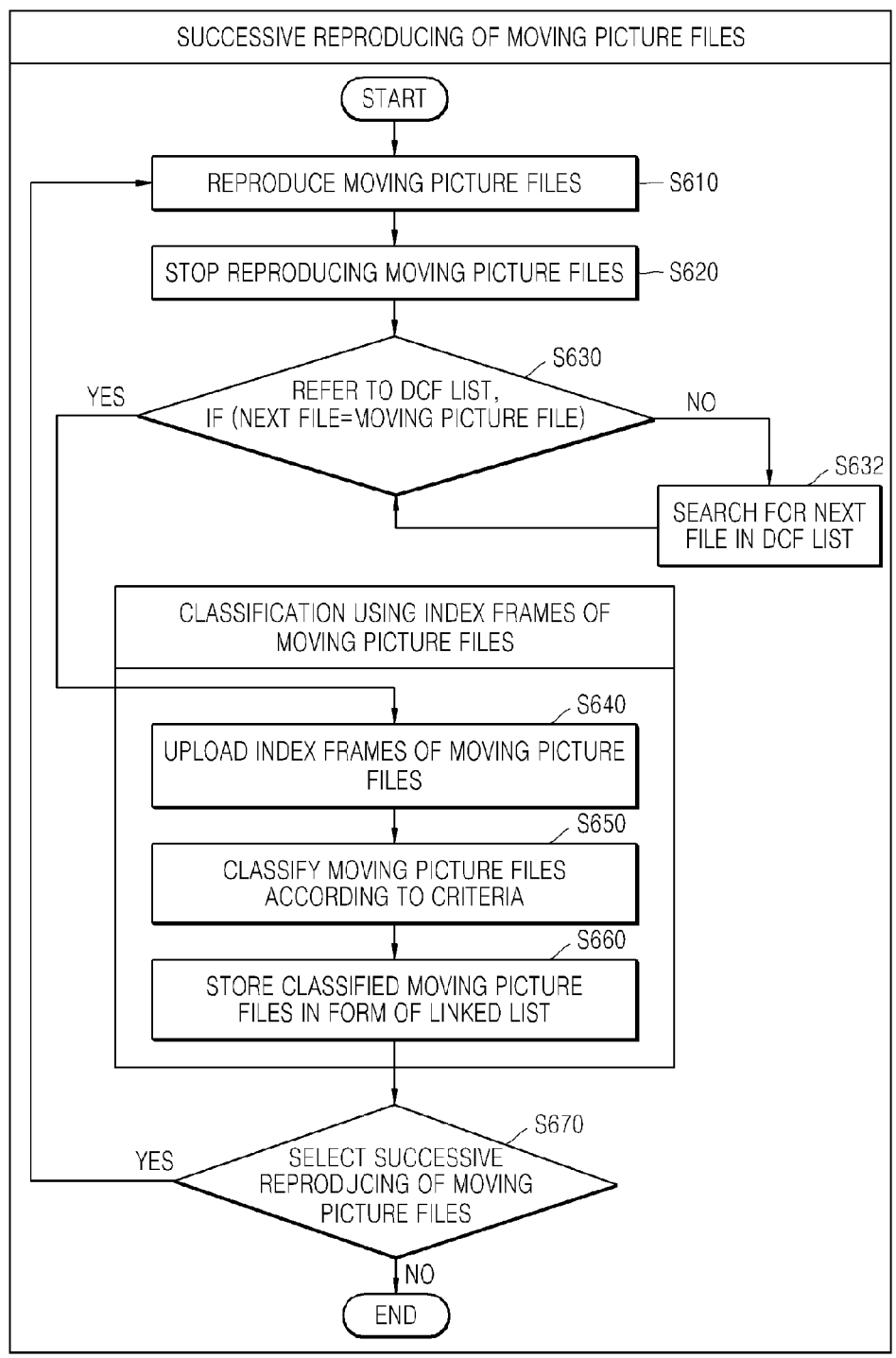
FIG. 6 is a flowchart illustrating processes of classifying the moving picture files and successively reproducing the moving picture files in the digital image processing apparatus of FIG. 1, according to an embodiment of the present invention.

In another example of reproducing the moving picture files successively, a moving picture detector 310 detects the moving picture files from among various files, classifies the detected moving picture files according to a user's selection, and the classified moving picture files are reproduced successively. FIGS. 5 and 6 are flowcharts illustrating processes of classifying the moving picture files and reproducing the moving picture files. These two examples will be described in more detail as follows.

Referring to FIG. 3, a digital signal processor (DSP) 300 includes a moving picture detector 310, a frame classifier 320, a list storage unit 330, and a successive reproducing unit 340.

The digital signal processor 80 or 300 stores various types of files received from the UI 20, the input signal processor 13, the SDRAM 30, the flash memory 40, and the SD/CF/SM card 50. For example, the digital signal processor 80 may process various files, for example, image files such as JPEG files and BMP files, audio files such as MP3 files and way files, and moving picture files such as MP4 or AVI files.

The moving picture detector 310 detects the moving picture files from the files stored in the storage unit of the digital signal processor 80, based on the file extensions of the files. The moving picture detector 310 may refer to a design rule for camera file systems (DCF) list to detect moving picture files by selecting the files having a file extension such as avi from among various kinds of files having file extensions such as jpeg, way, avi, etc.

The frame classifier 320 classifies one or more moving picture files detected by the moving picture detector 310 based on index frames of the moving picture files. The index frame may be a top image or a representative frame image of the moving picture file. The frame classifier 320 may classify the moving picture files according to criteria such as recorded time, face recognition, detected faces, color information, and recorded sound.

For example, when the plurality of moving picture files are classified based on the recorded time, it may be recognized that the moving picture files are taken during daytime or nighttime by using time data indicating the time when the file has been generated in the index frame.

If the user wants to watch moving picture files including persons or moving picture files including various scenes, the frame classifier 320 may classify the moving picture files according to the face recognition criteria. For example, when the face recognition criteria is selected, the frame classifier 320 may classify the moving picture files into moving picture files including persons and moving picture files including scenes based on the index frame by using a FACE DETECT algorithm.

Otherwise, the frame classifier 320 may classify the moving picture files including scenes by using color information so that the classified moving picture files may be reproduced successively. For example, when the moving picture file has an index frame, in which a scene including a certain color, for example, the scene of sea or sky is included, the moving picture file may be classified as a moving picture file including a scene.

As another example, the user may classify the moving picture files based on recorded sound. The index frames are classified according to the recorded sound, and accordingly, the moving picture files including the index frames may be recognized as to whether the moving picture files include scenes such as concert scenes or not.

The list storage unit 330 stores a list including the moving picture files classified by the frame classifier 320, and accordingly, when the user wants to reproduce moving picture files of a certain classification successively, for example, moving pictures including persons or moving pictures including scenes, the user may choose the list including the corresponding moving picture files.

The successive reproducing unit 340 may successively reproduce the moving picture files according to the list stored in the list storage unit 330 or may successively reproduce all of the moving picture files detected by the moving picture detector 310 when the user wants to watch all moving picture files.

FIG. 4 is a flowchart illustrating a process of automatically reproducing all of the moving picture files stored in the digital image processing apparatus 100 successively, according to an embodiment of the present invention.

After reproducing the moving picture file by the digital signal processor 80 (S410 and S420), it is determined whether the next file is a moving picture file or not in the DCF list (S430). When the next file is a moving picture file, the corresponding moving picture file is successively reproduced (S431), and when the next file is not a moving picture file, the next file is searched for in the DCF list (S432). In addition, the operation of determining whether the next file is a moving picture file is performed again (S430). The above operations are repeated until the end of the DCF list so as to search for the moving picture files and successively reproduce the moving picture files.

FIG. 5 is a flowchart illustrating a process of successively reproducing the moving picture files that are classified according to a classification criterion from among the moving picture files stored in the digital image processing apparatus 100, according to an embodiment of the present invention.

In the present embodiment, the moving picture files are classified by using index frames of the moving picture files. The index frame may be a top image or a representative frame of the moving picture file (S510).

The index frames of the moving picture files may be classified according to criteria such as recorded time, face recognition, detected faces, color information, and recorded sound information (S520). Detailed examples of the criteria are described with reference to FIG. 3.

The list including the moving picture files that are classified according to the criterion may be stored as a linked list (S530). When the list is stored in the form of a linked list, the user may easily reproduce the moving picture files later.

FIG. 6 is a flowchart illustrating processes of classifying the moving picture files and successively reproducing the moving picture files in the digital image processing apparatus 100, according to an embodiment of the present invention.

The digital signal processor 80 detects the moving picture files from among image files, audio files, and moving picture files stored in the storage unit in order to successively reproduce the moving picture files in the digital image processing apparatus. That is, when one moving picture file is reproduced and the reproducing is terminated, it is determined whether a next file is a moving picture file or not in the DCF list (S610-S630). The moving picture file may be detected by using file extensions. However, the method of detecting the moving picture files may be variously modified.

When the next file is not a moving picture file in the DCF list, the operation of searching for a moving picture file is repeated until a moving picture file is detected in order to classify the moving picture files (S630 and S632).

After detecting the moving picture files, the index frames of the moving picture files are uploaded (S640) to classify the moving picture files according to various criteria (S650). The criteria for classifying the moving picture files may include recorded time, face recognition, number of detected faces, color information, and recorded sound information of the index frames in the moving picture files. The criteria are described above with reference to FIG. 3. After that, the reproducing list of the moving picture files is stored as a linked list (S660). Then, when a user selects the successive reproducing of moving picture files (S670), operations of S610 to S660 may be repeated.

Figure 7:
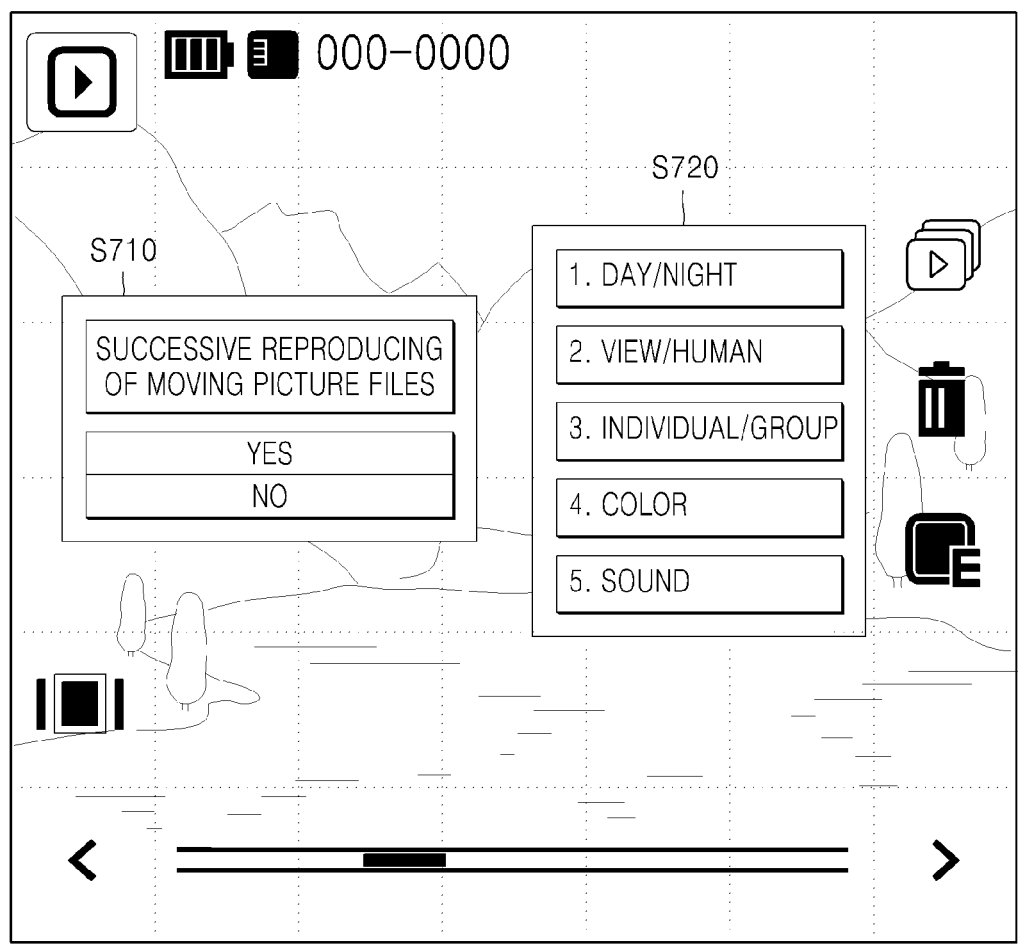
FIG. 7 is a pictorial diagram showing an example of a menu for successively reproducing the moving picture files in the digital image processing apparatus of FIG. 1, according to an embodiment of the present invention.

FIG. 7 is a pictorial diagram showing an example of a menu for successively reproducing the moving picture files in the digital image processing apparatus 100, according to an embodiment of the present invention.

Referring to FIG. 7, a hot key or a menu may be provided in the digital image processing apparatus so that the user may select successive reproducing of the moving picture files. When the user selects Yes with regard to successive reproducing of the moving picture files (operation S710), the criteria may be provided to the user (operation S720). When the moving picture files are reproduced according to the criterion selected by the user, the corresponding moving picture files may be successively reproduced through the operations illustrated in FIG. 6.

According to the present invention, moving picture files may be successively reproduced in a digital image processing apparatus which can play moving picture files. Therefore, a user may successively reproduce moving picture files without having to separately display each of the moving picture files.

In addition, according to the present invention, moving picture files which are similar to each other may be classified, and then, the classified moving picture files may be reproduced successively.

In general, an apparatus for performing the methods of classifying moving picture files and/or successively reproducing moving picture files according to the embodiments of the present invention may be implemented using any general purpose computing device or devices. Any of the computing devices may comprise a processor, a memory for storing program data and executing the program data, a permanent storage such as a disk drive, a communications port for handling communications with external devices, and user interface devices, including a display, keyboard, mouse, etc. When software modules are involved, these software modules may be stored as program instructions executable on the processor on a computer-readable storage medium, where the program instructions stored on this medium can be read by the computing device, stored in the memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computing devices so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A digital image processing apparatus comprising:
    a moving picture detector that automatically detects one or more moving picture files from among a plurality of files stored in a storage unit which stores at least one kind of file;
    a frame classifier that automatically classifies the one or more detected moving picture files based on subject matter of the images of respective ones of the detected moving picture files contained in index frames of the detected moving picture files;
    a successive reproducing unit that reproduces the classified moving picture files for files similarly classified based on the subject matter contained in the index frames by the frame classifier successively.

2. The digital image processing apparatus of claim 1, wherein the frame classifier classifies the moving picture files according to at least one criterion selected from the group consisting of recorded time, face recognition, number of detected faces, color information, and recorded sound.

3. The digital image processing apparatus of claim 2, further comprising a list storage unit that stores a list including the classified moving picture files.

4. The digital image processing apparatus of claim 1, wherein the moving picture detector detects the moving picture files based on file extensions of the plurality of files stored in the storage unit.

5. A method of successively reproducing moving picture files in a digital image processing apparatus including a digital signal processor, the method comprising:
    automatically detecting one or more moving picture files from among a plurality of files stored in a storage unit which stores at least one kind of file;
    automatically classifying the one or more detected moving picture files based on subject matter of the images of respective ones of the detected moving picture files contained in index frames of the moving picture files; and
    successively reproducing similarly classified, based on the subject matter contained in the index frames, said classified moving picture files.

6. The method of claim 5, wherein classifying the one or more detected moving picture files is performed according to one or more criteria including recorded time, face recognition, number of detected faces, color information, and recorded sound of index frames of the moving picture files.

7. The method of claim 6, further comprising storing a list including the classified moving picture files.

8. The method of claim 6, wherein the digital signal processor detects the one or more moving picture files based on file extensions of the plurality of files stored in the storage unit.

9. A digital image processing apparatus comprising:
    a moving picture detector having a picture file input and a moving picture file output, the moving picture detector configured to automatically detect one or more moving picture files from among a plurality of files input from a storage unit which stores at least one kind of file;
    a frame classifier having a moving picture file input coupled with the moving picture file output of the moving picture detector and a classified moving picture file output, the frame classifier configured to automatically classify the one or more detected moving picture files output from the moving picture detector based on subject matter of frame images taken from respective ones of the detected moving picture files in index frames of the detected moving picture files and output one or more classified moving picture files, wherein the index frames comprise content of frame images taken from respective ones of the detected moving picture files; and
    a successive reproducing unit having a classified moving picture file input, the successive reproducing unit configured to reproduce moving picture files similarly classified according to said subject matter based on said frame images taken from said respective ones of the detected moving picture files by the frame classifier successively.

10. The digital image processing apparatus of claim 9, wherein the frame classifier classifies the moving picture files according to at least one criterion selected from the group consisting of recorded time, face recognition, number of detected faces, color information, and recorded sound.

11. The digital image processing apparatus of claim 10, further comprising a list storage unit having a classified moving picture file input coupled with the classified moving picture file output of the frame classifier, the list storage unit configured to store a list including the classified moving picture files.

12. The digital image processing apparatus of claim 9, wherein the moving picture detector detects the moving picture files based on file extensions of the plurality of files stored in the storage unit.

13. A method of successively reproducing moving picture files, the method comprising:
- automatically detecting by a moving picture detector one or more moving picture files from among a plurality of files stored in a storage unit which stores at least one kind of file;
- automatically classifying by a frame classifier the one or more moving picture files based on subject matter of the images of respective ones of the detected moving picture files contained in index frames of the detected moving picture files and identifying a subset of the one or more moving picture files having a common classification criterion based on said subject matter contained in said index frames; and
- automatically reproducing by a successive reproducing unit the identified subset of the moving picture files successively.

14. The method of claim 13, wherein identifying the subset comprises performing at least one of face detection, face recognition or scene detection on the frame images.

\* \* \* \* \*